United States Patent [19]
Jarman

[11] 3,793,916
[45] Feb. 26, 1974

[54] FEEDBACK CONVEYOR SYSTEM
[76] Inventor: David J. Jarman, Box 181 R.R. No. 3, Aurora, Ind. 47001
[22] Filed: July 26, 1972
[21] Appl. No.: 275,316

[52] U.S. Cl............. 83/155, 83/157, 83/419, 83/467
[51] Int. Cl............ B26d 7/06, B26d 7/16
[58] Field of Search..... 83/155, 157, 250, 401, 419, 83/424, 467, 468

[56] References Cited
UNITED STATES PATENTS
3,370,494  2/1968  Schenck.................. 83/467 X
2,788,069  4/1957  Noojin, Jr. et al............. 83/155 X
3,662,635  5/1972  Yabuta................. 83/467
3,533,320  10/1970  Sederberg............. 83/155
3,186,453  6/1965  Green................ 83/250 X Primary Examiner—J. M. Meister
Attorney, Agent, or Firm—Alter, Weiss, Whitesel & Laff

[57] ABSTRACT

Material handling conveyor systems for use in cooperation with shear equipment. The conveyor system can be controlled to feedback or return sheared portions of the plates to the shear operator for further shearing operations.

22 Claims, 11 Drawing Figures

FEEDBACK CONVEYOR SYSTEM

This invention is concerned with material handling equipment and more particularly with conveyor systems for use with shearing equipment to manipulate the sheared and unsheared portions of plates being processed by the shears.

It is known in the art to use conveyors in conjunction with shearing operations to automate the shearing operations. The conveyors are mainly used for conveying the already sheared material from the conveyor to a stacking station for conveninet pickup.

In many operations it is necessary to take a second cut on the original sheared material. In such cases it is not convenient to use the regular presently available conveyors which only operate in a unidirectional manner to convey the sheared material away from the conveyor. Therefore, it has been necessary in the past to manually transport the already cut material from the rear of the shearing apparatus back to the front of the shearing apparatus to take a second cut. Usually more than one person is required to manually carry the cut plate from the rear of the shears to the front thereof because of the size and weight of the already cut plate.

Alternatively, the previously cut plate has been handled by a single individual utilizing hoisting equipment such as cranes or lift trucks for taking the cut plate from the rear to the front of the shear.

It is readily apparent that either the utilization of two men or a man and having equipment slows thee shearing operations and significantly increases the costs.

A further problem is encountered when shearing long plates, the sheared plate often develope what is called a "dog ear". The "dog ear" is caused because the knife of the shear engages one side of the plate to be sheared prior to engaging the rest of the plate. As the already sheared portion of the plate falls from the shear bed it bends the portion of the plate that is not already cut causing what is known in the trade as "dog eared plates".

Accordingly, an object of the invention is to provide a feedback conveyor to improve shearing operations by overcoming the difficulties presently encountered.

More particularly, an object of this invention is to provide a conveyor for removing the already processed and cut material from the shears to a stacking station and for selectively returning the material requiring further cutting to the front of the shears.

Another object of the invention is to provide a constant support for the sheet metal being cut even as it is sheared.

A related object of this invention is to provide a feedback conveyor that works automatically from the time the original sheet is fed into the shear.

Yet another object of the invention is to provide a gauge that can be automatically set to cut and recut material to specified sizes.

In accordance with one preferred embodiment of this invention the conveyor system is attached at the rear of the shears. It comprises a top surface which is level with the shear table. The top surface of the conveyor system drops as the shear blade traverses the plate to continually support the sheared plate. The sheared portion of the plate is then selectively transferred to a stacking station, to scrap bins, or back to the front of the shear for further processing.

Other objects and features of this invention will be best understood when considered in accordance with the following description taken in conjunction with the accompanying drawings wherein.

Figure 1:
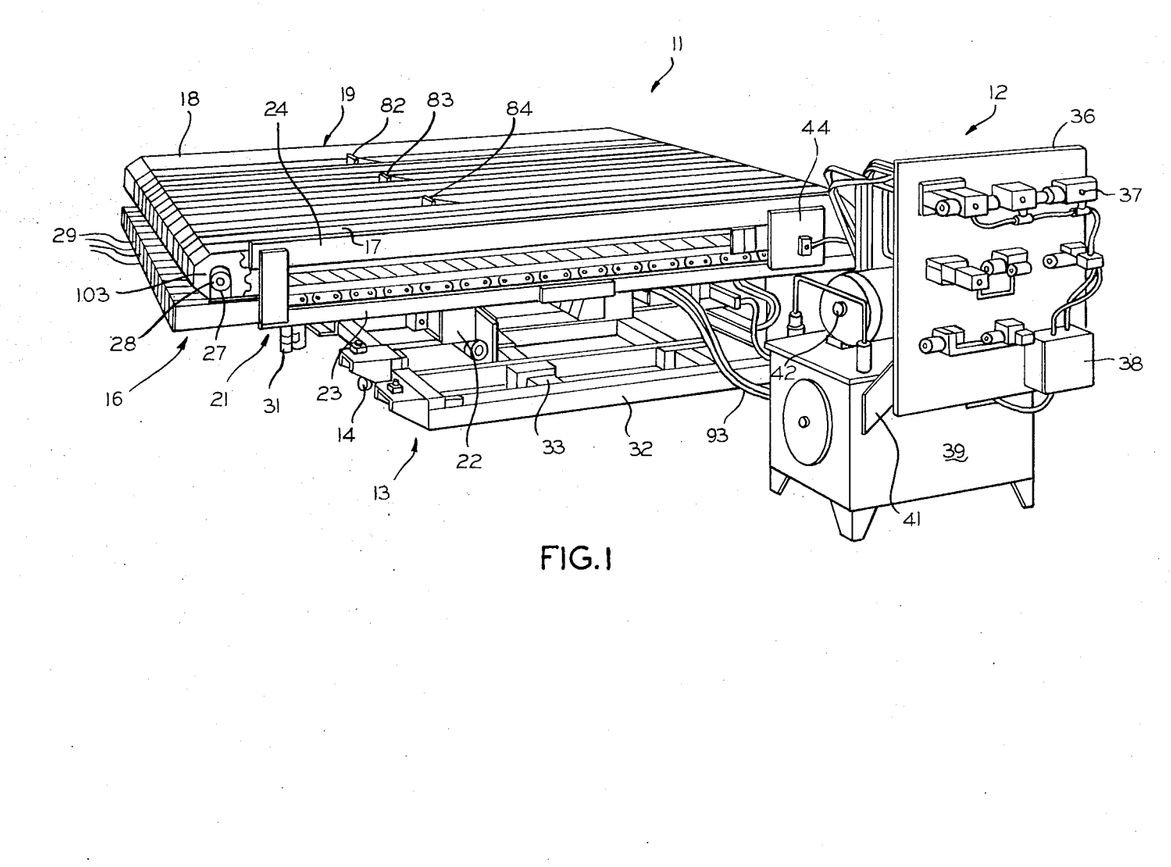
FIG. 1 shows the inventive feedback conveyor in pictorial form along with hydraulic controls therefor.

In the drawings FIG. 1 shows some essential parts of the automatic feedback conveyor system for utilization with automatic shear presses. The automatic feedback conveyor system comprises the conveyor assembly 11 and the hydraulic control unit 12. The conveyor 11 comprises a frame 13 mounted on casters, such as caster 14. The frame holds a conveyor chain assembly 16 that has on it a continuous chain, such as the narrow chain 17, or the wide chain 18.

Means are provided for actuating the shears responsive to a sheet of predetermined length being positioned in the shear. More particularly the conveyor assembly is equipped with back gauge assembly 19 shown in the raised position in FIG. 1.

The chains rest in chain support assembly 21. The chain support assembly comprises transverse beams, such as transverse beam 22, cross beams, such as lower cross beam 23, and side plate 24 separated by flange plates, such as flange plate 26. At the front of the lower cross beam 23 there is a bearing means such as bore bearing 27. A shaft 28 passes through the bore bearing 27. Mounted on the shaft 28 are driven sprocket wheels, such as sprocket wheel 29. The driven sprocket wheels are motivated by the chains which in turn are driven by a hydraulic motor assembly which will be described hereinafter.

Means are provided for selectively positioning the back gauge. More particularly one of the back gauge lift and lower cylinders is seen at 31.

The base assembly 13 comprises a rectangular frame made of longitudinal beams, such as beam 32, and cross beams, such as cross beam 33. The beams are preferably hollow tubular beams to minimize the weight of the assembly.

The control unit 12 comprises a valve board 36, on which are mounted the control valves such as valve 37 and an electrical control box 38. The valve board 36 is connected to a hydraulic tank 39 using flanges, such as flange 41. An electric motor, such as motor 42, drives a hydraulic pump. The pump is coupled to the conveyor through hydraulic hoses, such as hose 43. Electrical connection to the conveyor is made through the conveyor electrical connection box 44.

Figure 2:
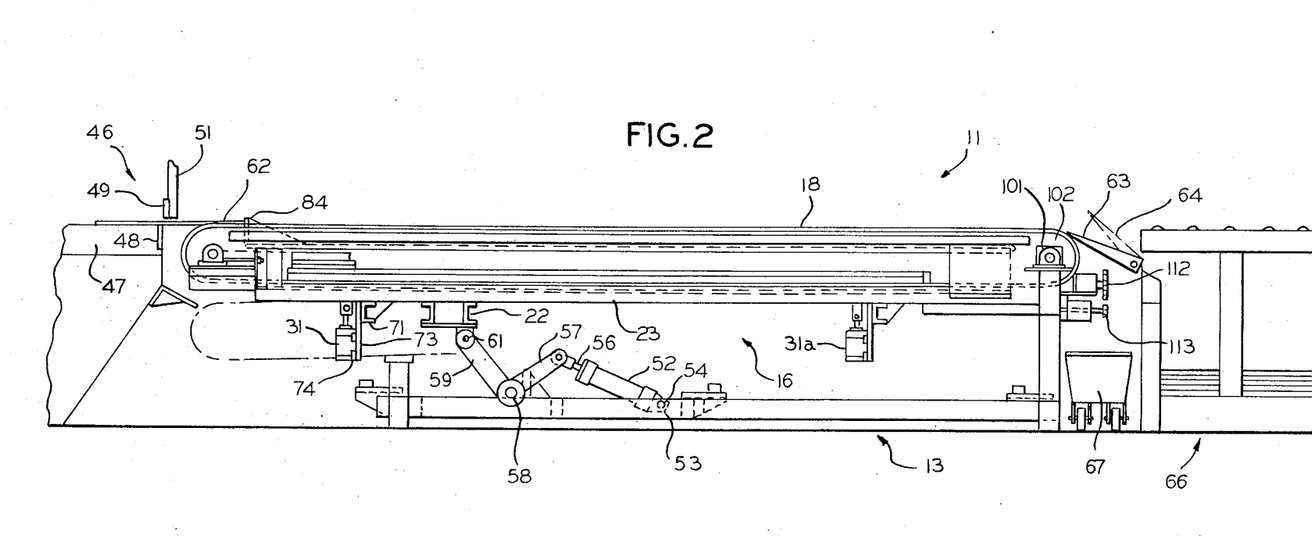
FIG. 2 is a side view of the automatic conveyor system showing the cylinders used for raising and lowering component parts thereof.

FIG. 2 shows the feedback conveyor system juxtaposed to a shear 46. Shear 46 comprises table 47 having a stationary shear blade 48 and a movable shear blade 49 mounted in the movable mounting 51. The normal position of the top of the feedback conveyor is slightly higher than the top of table 47.

Means are provided for raising and lowering the feedback conveyor. More particularly, hydraulic cylinders, such as cylinder 52, are pivotally mounted to base frame 13 by brackets, such as bracket 53, in cooperation with cylinder axle 54.

Figure 4:
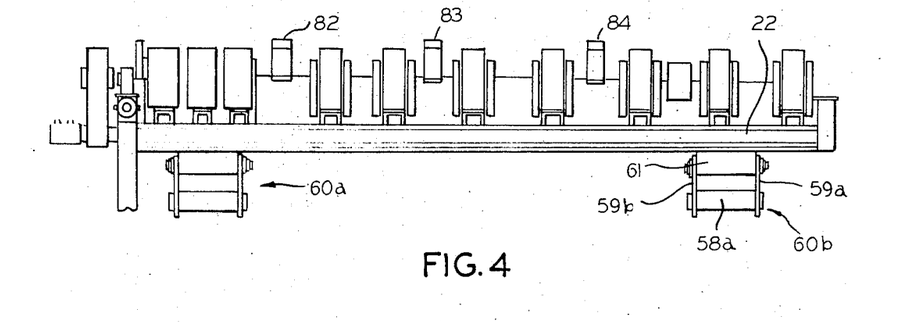
FIG. 4 is a front view or shear side view of the feedback conveyor system.

The hydraulic cylinder 52 has a movable piston 56 which is pivotally connected to an axle control member 57. The axle control member 57 is fixedly connected to axle 58. Axle 58 is similarly affixed by key slot or any other well known means to roller control members 59a and 59b (FIG. 4). The roller control members terminate in a roller 61 rotatably affixed in the roller control members. The roller 61 is juxtaposed to cross member 22 of the conveyor bed 16 and rolls thereacross in the raising and lowering process responsive to the position of piston 56. As shown in FIG. 4 there are at least one means for raising and lowering the conveyor on each side of the shear end of the conveyor.

When the conveyor is in its upraised starting position, it is actually slightly higher than the height of blade 18 so that sheet metal pieces, such as sheet metal piece 62, is disposed away from the top of blade 18 thereby prolonging the life of the blade. In this table height position the roller 61 is at the right hand side of beam 22. To lower the conveyor the cylinder 52 is controlled to eject piston 56 and cause axle control 57 to rotate axle 58 in a counterclockwise direction thereby lowering the top of roller 61 as it rolls towards the left hand side of beam 22. The conveyor in this way is lowered to its bottommost position. The lowering of the conveyor occurs so that the conveyor continually supports the sheet metal as it is being cut, eliminating any bends which otherwise may have occurred.

It should be noted that as piece 62 is placed through the shear head and over the conveyor top it abuts the back gauge 19. Means are provided in the back gauge for controlling the shear operation responsive to the sheet metal piece abutting the back gauge.

The blade drops and cuts the material. The material that is cut can then either be fed forward over the scrap separator to stacker or it can be fed back beneath the shear blades for another cut in the shear. These operations occur under either automatic or manual control.

Means are provided for separating scrap material from the cut material that can be stacked. This means is a stacker blade 63 shown in FIG. 2. The stacker blade is hydraulically operated to the open position shown in dash line form at 64. The hydraulic cylinder that controls the scrap separator blade is not shown. When the scrap separator blade is in the position shown at 63 then the properly cut pieces are fed to the automatic stacker shown generally as 66. Otherwise, with the scrap separator blade in the upraised open position 64, the scrap pieces fall in the scrap container 67.

The hydraulic cylinder 31 used to elevate or lower the back gauge is rigidly coupled to beam 71 which depends downwardly from a beam, such as beam 23, of the conveyor bed. More particularly, a cylinder mounting plate 73 is fastened to the channel or beam 71. The plate 73 has attached thereto bracket 74, for rigidly holding cylinder 31 in place. Cylinder 31 cooperates with other cylinders, such as cylinder 31a, for lifting and lowering the entire back gauge assembly 19.

The back gauge assembly is elevated to the upraised position when the sheet metal pieces are placed through the shear. The back gauge is automatically lowered as the shear blade cuts the sheet metal. The sheared pieces thus pass unhindered over the lowered back gauge and into the stacker or scrap metal container.

The back gauge assembly 19 comprises a unitary cross member 81 (FIG. 3) which interconnects the individual back gauges such as back gauges 82, 83 and 84. The individual back gauges rise perpendicularly from extending members, such as extending member 87. A brace member 88, for example, rigidizes the coupling between members 81, 87 of the back gauge.

The back gauge assembly 19 also includes means for selectively positioning the gauge anywhere between the shear end of the conveyor and a point at least ten feet back from the shear end of the conveyor. The means, as shown, include threaded rod members 89a, 89b. The threaded rod members 89a, 89b are located in housings, such as housing 91, for most of its length.

Means, such as hydraulic motor 92, operated from the main pump unit, are used for turning threaded rods 89a, 89b. The motor 92 is coupled to gear box 93 which is in turn coupled to threaded rod 89a and also through coupling shaft 94 to a second gear box 96 that is coupled to threaded rod 89. Thus, both threaded rods operate at the same speed to selectively move the back gauges toward or away from the shear.

Figure 5:
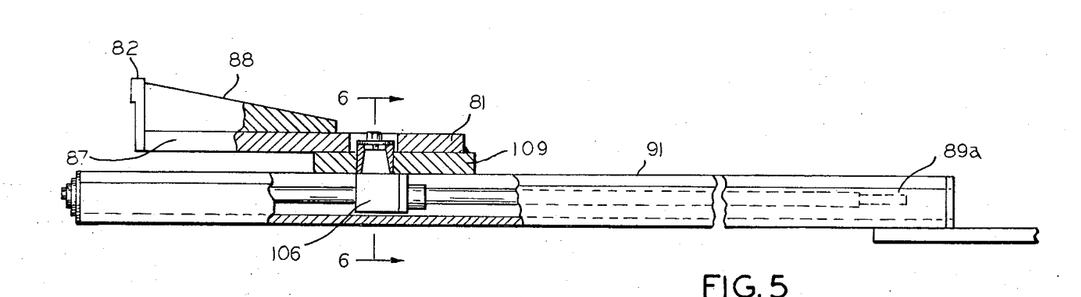
FIG. 5 is a partial sectional view of the back gauge housing used with the feedback conveyor.
Figure 6:
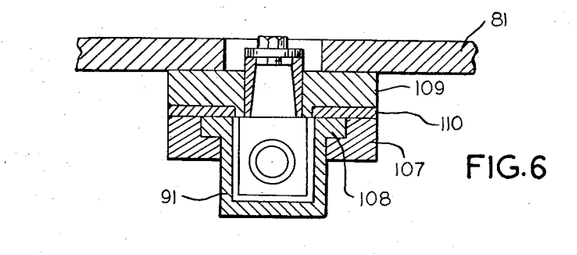
FIG. 6 is a partial sectional view taken through line 6—6 looking in the direction of the arrows in FIG. 5.
Figure 7:
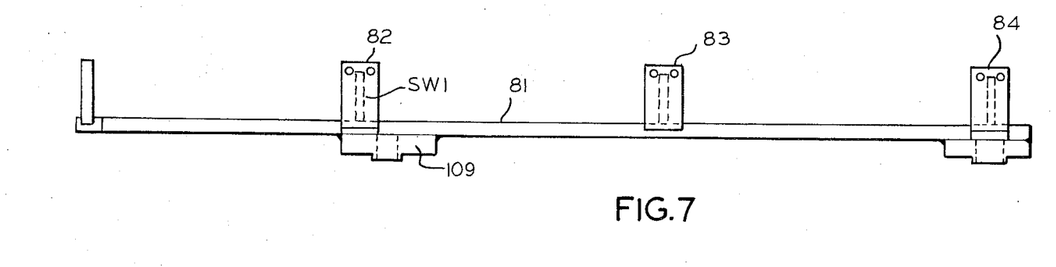
FIG. 7 is a top view of the back gauge assembly.

FIGS. 5, 6 and 7 best show the back gauge assembly. More particularly therein are shown the threaded rod 89a in the protective housing 91. A traveling nut 106 is shown mounted on the threaded rod. The traveling nut 106 has fixedly attached thereto the transverse plate 81. As is readily discernable, particularly in FIG. 6, the transverse plate 81 moves along on a slide bar 107 which slides on flanges such as flange 108 of housing 91. The transverse plate 81 is shown welded to a bottom plate 109. A wear strip 110 may be used. The threaded rod 89a is rotatively supported by means such as flange bearing assembly 111. Thus, as the hydraulic motor causes the threaded rod to rotate, the back gauge moves toward the shear or away from the shear depending on whether the rod is rotated clockwise or counterclockwise. In FIG. 7 the back gauge plates 82, 83 and 84 are shown equipped with limit switches, such as SW1.

Means are provided for automatically reading out the distance moved by the back gauge stop. In FIG 2 are shown a pair of sprocket wheels attached to the back plate drive motor 92 through gear box 96. More particularly, drive and driven sprocket wheels 112 and 113 respectively are mounted to the hydraulic motor through gearing boxes. The rotation of the driven sprocket wheel 113 drives a flexible shaft (not shown) which connects to the control panel to automatically read out the number of inches the back gauge is moved from the shear end of the conveyor.

Figure 3:
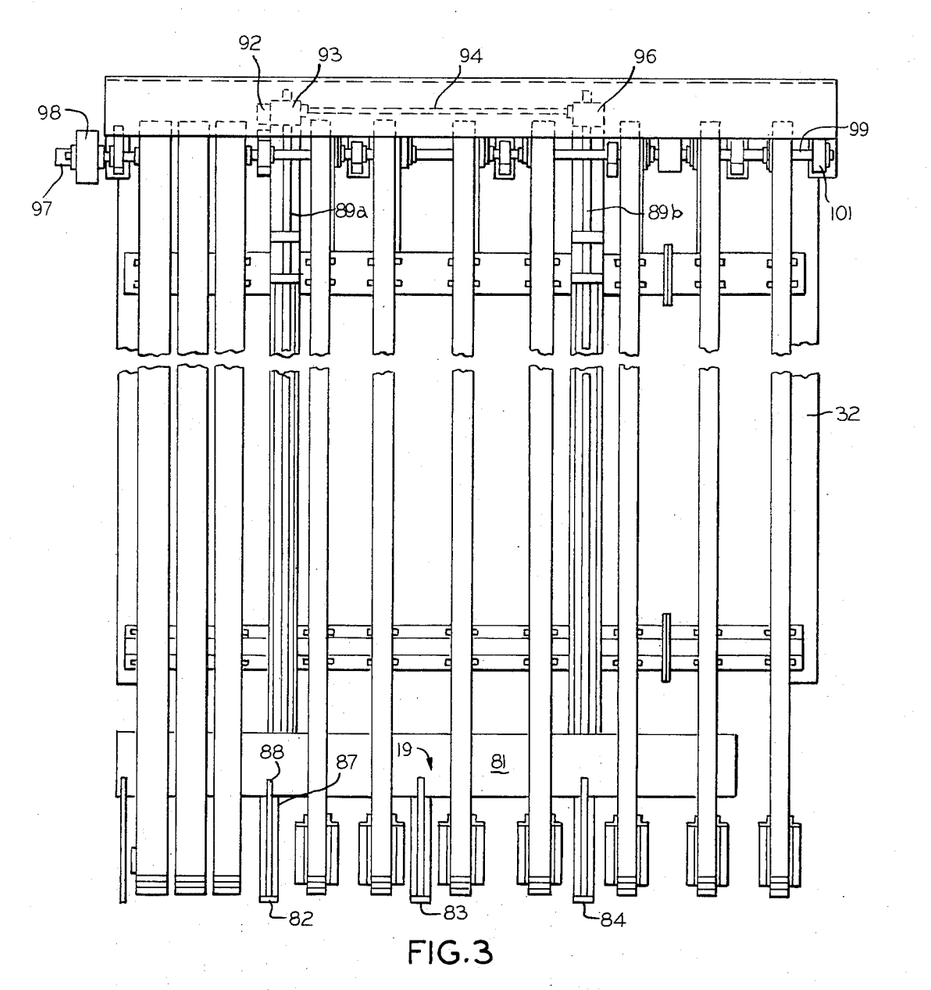
FIG. 3 is a top view of the conveyor system.

The chains or belts, such as chain 17, are operated responsive to the rotation of hydraulic motor 97 through gear box 98 which drives a shaft 99 (FIG. 3).

The drive shaft 99 is rotatively mounted in bearing blocks such as bearing block 101.

Fixedly mounted to the drive shaft 99 are drive sprockets such as sprocket 102, shown in FIG. 2. The sprocket is of the proper size to force the chain or endless belt, such as belt 18, to continuously move responsive to the rotation of sprocket 102. The drive sprocket actuation of the belt, of course, causes the idler or driven sprockets, previously described herein, such as sprocket 29, to rotate.

Figure 8:
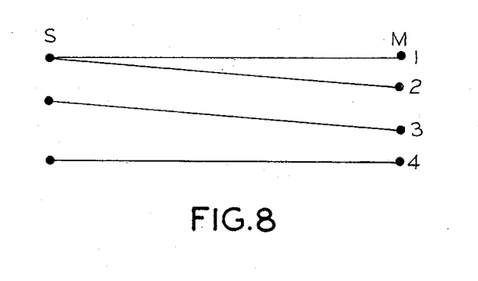
FIG. 8 is a line locus drawing of the front of the feedback conveyor.

FIG. 8 shows by line drawing the shear side of the conveyor in its various up and down positions. The conveyor moves with the cutting edge of the shear blade to support that sheet being cut. Line No. 1 indicates the conveyor at the starting or table height position. Line No. 2 indicates a first downward movement of the conveyor as the blade cuts into the sheet metal with a portion of the sheet metal already cut. Line No. 3 indicates the position of the conveyor with more of the sheet metal cut. Finally, Line No. 4 indicates the lowest conveyor position which occurs when the cut is completed.

Figure 9:
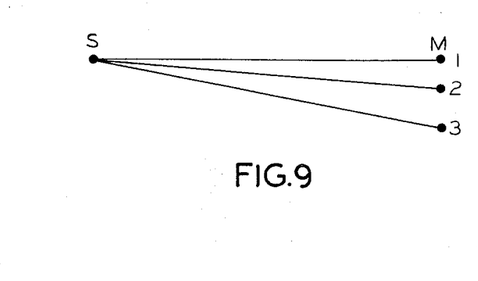
FIG. 9 is a line locus drawing of the end of the feedback conveyor.

FIG. 9 shows by line drawing the stacker side of the conveyor in its various up and down positions during the cutting operation. Line No. 1 indicates the conveyor at the starting or table height position. Line No. 2 indicates the position of the conveyor during the cutting operation. Line No. 3 indicates the position of the conveyor as the cut is finished. After the cut is finished the conveyor returns to the original position, i.e., line No. 1. The movement of the conveyor around the one corner of the stacker side of the conveyor is facilitated through the use of means such as universal coupling 85 best seen in FIG. 4.

Figure 11:
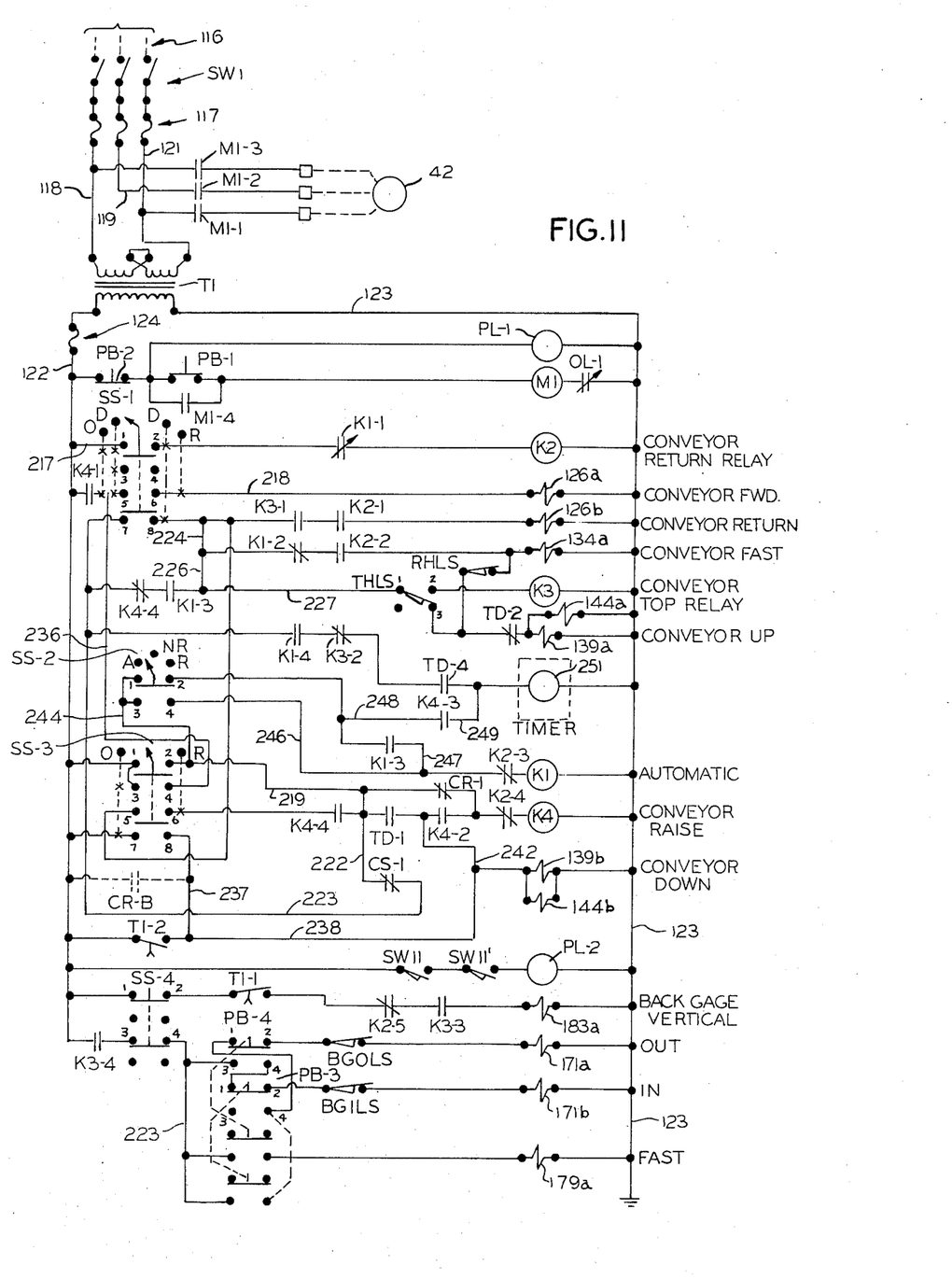
FIG. 11 is a hydraulic schematic of the controls of the feedback conveyor system.

When the conveyor is put into operation the electrical controls are first used to start the motor 42, (FIG. 11). In a preferred embodiment, motor 42 is a 14 h.p. 3-phase motor. The motor is supplied from a 440 volt 60 cycle source, generally indicated at 116. A three pole switch SW-1 connects the source 116 through fuses 117, lines 118, 119, 121, contactor contacts M1-1, M1-2 and M1-3 to the motor. Lines 118 and 121 also connect to the primary of transformer T-1 which transforms the 440 volt supply to 120 volts at its secondary. The output of the secondary of transformer T-1 goes through lines 122 and 123. Line 122 has a fuse 124 in series therewith. The line 123 is the ground bus line.

Means are provided for starting the motor. More particularly, a normally open push button start switch PB-1 is provided. The start switch is in series with a normally closed push-button stop switch PB-2.

When the start switch is operated to its closed position power is provided to control contactor coil M1 through a normally closed overload contact OL-1 to ground line 123. The energization of coil M1 closes contactors M1-1, M1-2, M1-3 and M1-4. The closing of contactors M1-1, M1-2 and M1-3 energizes the motor through the obvious circuitry. The start switch PB-1 is bridged by normally open contacts M1-4, which close with the energization of the coil M1. Thus, to start the motor push button switch PB-1 is pushed in and released. The motor then can be stoppped by operating push button stop switch PB-2. When switch PB-2 is operated, it opens the energization circuit of contactor coil M1. The contacts under the control of contactor coil M1 return to their normal open position.

Means are also provided for indicating when switch SW-1 is operated. Thus, pilot light PL-1 is provided and is energized over a circuit that goes from line 122 through switch PB-2 in its normally closed position and through pilot light PL-1 to line 123.

The conveyor is provided with manual and automatic controls. In the manual control mode, the controls are used to direct the conveyor chain to carry the cut sheet metal from the shears to the stacker. Alternatively, the direction of the chains can be reversed to bring the cut sheet back into the shear. Thus, controls are provided for selectively operating the chains in forward or return directions. The chains are moved by the hydraulic conveyor motor 97 shown in FIG. 10. The direction of rotation of hydraulic motor 97 depends on the attitude of an electrically controlled 4-way valve 126.

Figure 10:
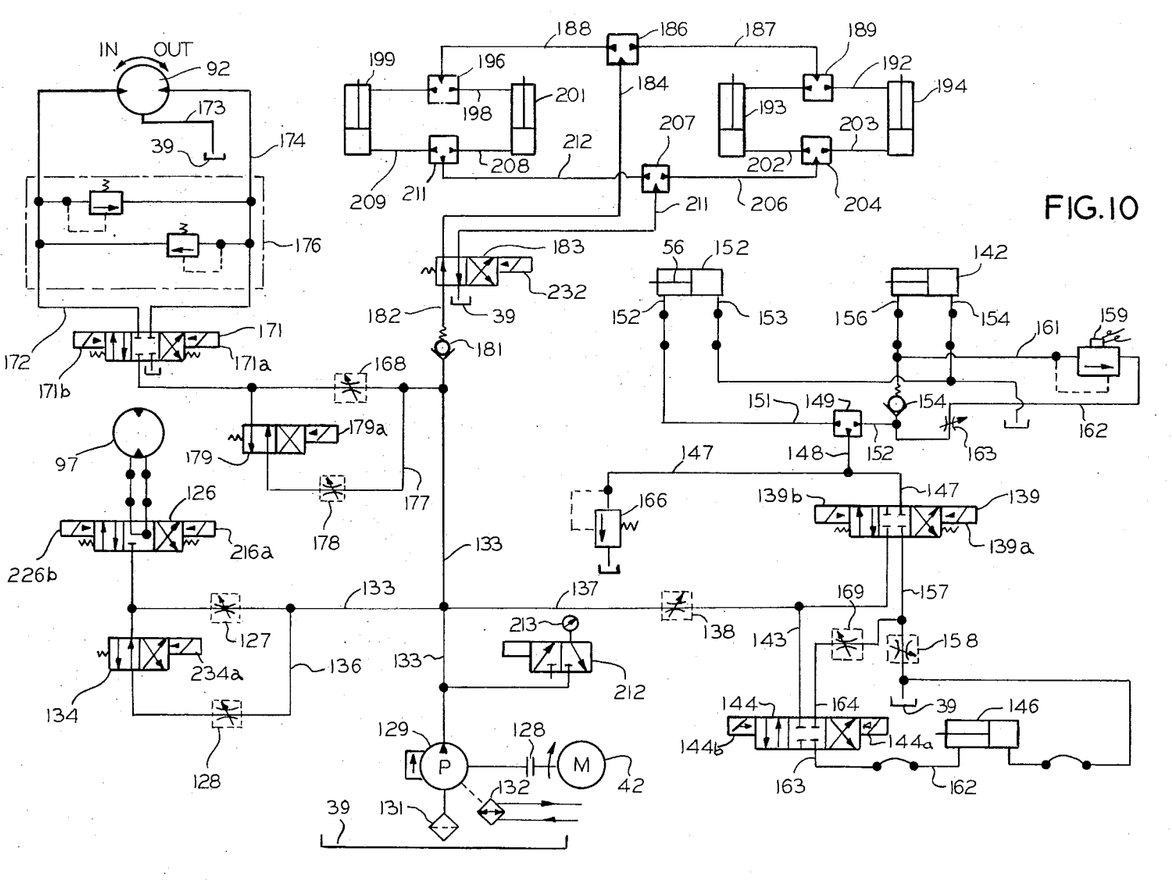
FIG. 10 is an electrical schematic of the controls for the feedback conveyor system.

Means are provided for selectively running the conveyor at a normal speed or at a fast speed. This means comprises the needle valves 127 and 128 in the hydraulic line feeding into the 4-way valve 126. More particularly, as shown in FIG. 10, the motor 42 is connected through coupling 128 to hydraulic pump 129. The hydraulic pump in a preferred embodiment is a 15 gallon per minute Racine pump, Supervane PSV-PNSO-2OGRS. It takes the hydraulic fluid from the 80 gallon reservoir 39 through a suction filter 131. Heat exchange or temperature control means 132 are normally provided for maintaining the temperature of the oil at an operating level. The outlet of the pump is hydraulic line 133, which feeds directly into either needle valve 127 or through line 130 into needle valve 128 depending on the condition of a 4-way conveyor speed control valve 134. When valve 134 is not energized the conveyor operates at a fast level since hydraulic fluid is supplied to the conveyor motor through two paths. The first path is through lines 133, 136, valve 128, unoperated valve 134, through valve 126 operated to either the conveyor out or conveyor return position to operate the conveyor motor 97 either in a clockwise or a counterclockwise direction. The second path is through line 133, and valves 127, 126 to the motor. When valve 134 is energized only the latter path is available.

Means are also provided for raising and lowering the conveyors. More particularly, line 133 is connected to line 137 and through a conveyor up needle valve 138 to a conveyor up or down 4-way valve 139.

Valve 139 controls the operation of the conveyor lift cylinders 52 and 142. These cylinders are located to control the raising and lowering of the shear end of the conveyor. Line 137 also leads through a line 143 to valve 144 that controls conveyor lift cylinder 146. The conveyor lift cylinder 146 is located at the up and down moving side (the M side in FIG. 9) of the stacking end of the conveyor. The stationary side of the stacking end of the conveyor has the universal coupler 85 for retaining that section of the conveyor in a substantially vertically stationary position.

The hydraulic circuitry is arranged so that cylinder 142, the cylinder that is on the side "S" at the shear end of the conveyor (FIG. 8), brings that side of the conveyor down slower than does the culinder 52 which is on the M side of the shear end of the conveyor as shown in FIG. 8. The controls are also arranged so that cylinder 146 is actuated to re-elevate the M side of the stacking end of the conveyor after the cut is completed and while the conveyor is operated to transfer the cut sheet metal to the stacker. At that time the entire conveyor is re-raised to slightly higher than the table height which is the normal starting position. Side M of the stacking end is raised using cylinder 146.

The hydraulic paths to cylinders 141 and 142 comprise line 147 extending from valve 139, line 148, and through proportionator 149. The proportionator assures equal amounts of fluid are sent to cylinders 52 and 142 during the elevation of the conveyor to return it to the raised position. Thus proportionator outputs 151 and 152 lead to cylinders 52 and 142 respectively. The reservoir outlets of the cylinders are shown as 153 and 154, respectively.

As best seen in FIG. 2 when the piston 56 of the cylinder 52 is retracted the conveyor is raised. Thus, when valve 139 is operated to connect line 137 to lines 147, 148 and 151, the piston 56 of cylinder 52 is forced inward and the conveyor is raised. At the same time pressure is applied to retract the piston of cylinder 142. The hydraulic fluid travels from proportionator 149 through outlet line 152, check valve 154 to inlet 156 to force the piston of cylinder 142 inward and thereby raise the conveyor.

To lower the conveyor, valve 139 is operated to connect line 147 to the reservoir through line 157 and needle valve 158. Thus, line 148 is connected to the reservoir and the weight of the conveyor forces the piston 56 of cylinder 52 outward so that the conveyor is lowered.

The side of the conveyor that is held in the upraised position by piston 142 is not lowered as fast since the check valve 154 blocks the flow of fluid at the piston side of the cylinder so the piston cannot be forced down by the weight of the conveyor. However, valve 159 operates to provide a path to the reservoir from the piston side of the cylinder through line 161, the valve 159, line 162, needle valve 163, line 152, proportionator 149 and back to the reservoir through a previously traced path.

The needle valve 163 controls the rate at which one side of the conveyor is lowered. This valve 163 is adjusted so that the conveyor lowering rate matches the shear blade lowering rate. As the lowering of the shear end of the conveyor continues, the valve 144 is similarly operated to enable the lowering of the movable side of the stacker end of the conveyor due to the emergence of the piston of cylinder 146. The piston of cylinder 146 is forced outward when valve 144 is operated to couple line 162 through the valve 144 to line 164, needle valve 169, line 157 and needle valve 158 to the reservoir. The needle valve 169 is placed in the line 164 to control the rate at which the movable side of the stacker end of the conveyor is lowered.

To raise the movable side of the stacker end of the conveyor, valve 144 is operated to couple high pressure line 143 to line 162 to retract the piston of cylinder 146.

It should be noted that means are provided for safety purposes for releasing the pressure line in the event the pressure builds too high. More particularly, pressure relief valve 166 is provided at line 147. Thus, if the pressure in line 147 builds up above a predetermined level, valve 166 opens to couple the line and all lines coupled thereto to reservoir pressure.

Means are provided for controlling the back gauge to the desired position, with respect to the distance from the shear so that the size of the sheet cut is accurately and automatically controlled. In addition, means are provided for raising and lowering the back gauge so that the back gauge is in the upraised position when the sheet is fed through the shear and is in the down position after the shear has taken the cut.

As had been noted before, the back gauge is operated forward and backward responsive to the rotation of hydraulic motor 92. The hydraulic motor 92 is fed from line 133 through needle valve 168 in line 159 to 4-way control valve 171. As illustrated in FIG. 10, the motor rotates in a counterclockwise direction responsive to pressure being applied through line 172, through the motor to line 173 and the reservoir 39. When the motor moves counterclockwise, then the back gauge is moved closer to the shear. On the other hand, when valve 171 is operated so that pressure is applied to line 174, then the motor turns to cause the back gauge to move away from the shear. A double relief valve 176 is provided to assure a path between the high pressure line and the reservoir line when the pressure builds above a certain point. The relief valve being a double relief valve operates either when line 174 is a pressure line or when line 172 is a pressure line.

Means are provided for operating the back gauge towards or away from the shear at different speeds. More particularly, line 177, needle valve 178 and valve 179 bridge needle valve 168 in the circuit leading from pressure line 133 to valve 171. Needle valve 168 is adjusted to allow a lower rate of flow to the motor than does needle valve 178. Thus, if valve 179 is operated to enable needle valve 168 to be bypassed, then the higher rate of flow that passes through needle valve 178 causes motor 92 to operate at a higher speed thereby moving the back gauges at a higher speed.

Means are provided for raising and lowering the back gauges. More particularly, line 133 leads through check valve 181 to line 182. Line 182 goes through control valve 183 to line 184. Line 184 feeds into proportionator 186. The proportionator 186 assures an equal flow to lines 187 and 188. Line 187 leads to proportionator 189. Proportionator 189 assures an equal flow through line 191 and 192 which are attached to the piston side of cylinders 31a and 31b, respectively. Line 188 leads through proportionator 196 to lines 197 and 198 which are connected to the piston side of cylinders 31 and 31c, respectively.

The other ends of the cylinders 31a and 31b are connected through lines 202 and 203, respectively, to proportionator 204. Proportionator 204 leads to line 206 which in turn leads to proportionator 207. The other ends of cylinders 31 and 31c are connected through lines 208 and 209, respectively, to proportionator 211. Proportionator 211 is connected by line 212 to proportionator 207. Proportionator 207 is connected to valve 183 through line 211.

When the valve 183 is in its normal unoperated position the back gauges are in the upraised position because of the pressure on line 182 passing through proportionator 186 and to the piston sides of the cylinders 31, 31a, 31b and 31c, through the path previously traced. The pressure forces the pistons inward and pushes fluids from the other side of the cylinder through the proportionators 211, 204, and 207 to line 211, connected through valve 183 to reservoir 39.

When the valve 183 is energized, then line 182 is connected to line 208 to pressurize the other side of cylinders 31, 31b, 31a, and 31c, to force the pistons from the cylinders and raise the back gauge assembly. The fluid from the piston sides of the cylinders travels through proportionators 196 and 189, proportionator 186 through valve 183 down to reservoir 39. The check valve 181 assures that the line 133 is not connected directly to the reservoir.

Means are provded for automatically checking the pressure of pressure line 133. This means includes a gauge isolator valve 212, which connects a gauge to the pressure line responsive to the operation of the valve 212.

Returning now to the electrical schematic of FIG. 11 therein is shown how the hydraulic system operates responsive to the energization of the various valves as different switches are manipulated.

Means are provided for selecting the direction of travel of the conveyor belts. More particularly, a push botton selector switch SS-1 is provided to control the direction of the conveyor. For example, when the push button selector switch is set to the "Out" position and pushed, then valve 126 is operated because of the energization of coil 126a of that valve. Coil 126a is energized over a circuit that extends from line 122, which is the high voltage line, through line 217, switch contacts SS1-3 to SS1-4, through line 218, coil 216 to ground line 123. The energization of coil 126a causes the conveyor motor to run so as to move the belts or chains forward or away from the shears.

In operation the operator first turns on the power as previously described to energize the pump motor. The operator normally brings the conveyor up to its table top or raised position. This is accomplished by operating switch SS1 to the "Out" position, switch SS2 to the "Auto" position and switch SS3 to the "Raise" position. In the "Out" position poles 5 and 6 of switch SS1 are connected together. In the "Auto" position poles 3 and 4 of switch SS2 are connected together. And in the "Raise" position poles 1 and 2 and 5, 6 of switch SS3 are connected together. The operation of these switches in this manner energizes coils 139a and 144a of the up valves 139 and 144. The circuitry for energizing coils 139a and 144a extends from the line 122 connected to the high side of transformer T1, through poles 1 and 2 of switch SS3, lines 219, 222, normally closed contacts CS-1 on the shear, line 223, normally closed contacts K4-4 of "Conveyor Raise" relay K4, normally open contacts K1-3 on "Automatic" relay K1 in the operated condition, line 227, contacts 1, 3 of the table height limit switch THLS, normally closed contacts TD2 of the time delay circuit 251, and through coils 139a, 144a to ground bus 123.

The energization of the coils 139a and 144a of valves 139 and 144 causes the conveyor to rise to its topmost or table top position. When the conveyor is in the topmost position the switch THLS will operate to connect its contacts 1 and 2 and thus the limit switch THLS will open the circuit to coils 139a and 144a. It should be noted that "Automatic" relay K1 operates over the circuit that extends from line 122 through poles 1 and 2 of switch SS3, poles 3 and 4 of switch SS2, line 246, normally closed contact K2-3 on "Conveyor Return" relay and through the coil of relay K1 to the ground bus 123. Thus, the conveyor will be moved up to its topmost position and maintained in that position.

Next, the operator sets the back gauge at the distance desired. This is accomplished by operating the back gauge up and down switch SS4 to the up position, i.e., connecting poles 1 and 2 together to energize coil 138a of valve 183 to raise the back gauge. The energization circuit extends from line 122 through contacts 1 and 2 of switch SS4 through time delay contacts T1-1, normally closed contacts K2-4 of the conveyor return relay K2, contacts K3-3 of the "Conveyor Top" relay K3 operated to the closed position and through coil 183a to ground bus 123.

The "Conveyor Top" relay K3 was operated when limit switch THLS operated to connect its contacts 1 and 2 over the circuit that extends from high voltage line 122 through contacts 1 and 2 of "Raise" switch SS3, lines 219, 222, normally closed contacts CS1, line 223, normally closed contacts K4-4 of "Conveyor Raise" relay K4, contacts 1 and 2 of switch THLS, and through the coil of relay K3 to ground bus 123.

When the back gauge is in the raised position, the gauge in or gauge out switches are operated to control the direction of rotation of hydrualic motor 92. More particularly, when switch PB4, the "back gauge in" switch is operated, a circuit is completed from line 122 through normally opened contacts K3-4 operated to the closed position, contacts or poles 3 and 4 of the SS4 switch which are normally closed, line 223, poles 3 and 4 of switch PB3 and poles 1 and 2 of the switch PB3, limit switch BGILS (Back Gauge In Limit Switch) in the closed position and through coil 171b to ground bus 123.

Alternatively, to direct the back gauge toward the stacker side, switch PB3 is actuated which connects and operates circuit that extends from line 122 through operated contact K3-4, normally closed 3, 4 of switch SS4, lead 223, contacts 3 and 4 of switch PB3, contacts 1 and 2 of PB4, limit switch BGOLS (Back Gauge OUt Limit Switch) and through coil 171a to ground bus 123. If either switch PB4 or PB3 are pushed in further while in the operated position, coil 179a of valve 179 is operated to bridge needle valve 168 through needle valve 178 and thereby operate the back gauge at its fast speed.

In the manual operational mode directional selector switch SS1 is operated to the "Out" position, the automatic control switch SS2 is operated to the "Down" position, the continuous run and raise selector switch SS3 is operated to the raise position.

The sheet metal plate is put onto the conveyor through the shear blade opening. When the plate reaches the back gauge the blade is operated and the plate is sheared. After the plate has been sheared, the directional control push button switch SS1 is pushed if it is desired to return the plate. This sets the switch SS1 to the return mode. If it is not desired to return the plate the switch SS1 is allowed to remain in the "Out" position. Then the conveyor out coil 126a of valve 126 is energized over a circuit that extends from line 122 through operated normally open contact K4-1, poles 4 and 5 of switch SS1, line 218 and through coil 126a to ground bus 123. Relay K4 is operated over a circuit that extends from line 122, poles 1 and 2 of switch SS3, line 219, normally closed contacts CR-1 on the shear which open when the blade is in the down position, and through coil K4 to ground bus 123.

Responsive to operating switch SS1 to the "return" position "return" relay K2 operates over the circuit that extends from line 122 through contacts or poles 1 and 2 of switch SS1, normally closed contacts K1-1, and through coil of relay K2 to the ground bus 123.

The conveyor is caused to return to the upraised position. More particularly the conveyor up valve coils 144a and 139a are energized over the circuit that extends from line 122 through poles 1 and 2 of switch SS3, line 219, operated contacts K4-4, poles 6 and 5 of switch SS3, line 224, line 227, contacts 1 and 3 of the table height limit switch THLS, delay TD1, and through valve coils 144a and 139a on valves 144 and 139 to actuate the conveyor to the up position.

As soon as the conveyor reaches the table height position, then the conveyor return coil 126b is energized over a circuit that extends from line 219, through contacts K4-4, contacts 5, 6 of SS3, line 227 through contacts K3-1 on the operated conveyor top relay, contacts K2-1 on the operated conveyor return relay and through coil 126b to ground bus 123. Thus, the piece is brought back through the conveyor blade and another cut can be made on the sheared piece in the same manner as heretofore explained without the necessity of carrying the sheared piece to the front of the shear.

It should be noted that means such as coil 134a of valve 134 can be operated to speed up the movement of the conveyor celt. Coil 134a operates over a circuit that extends from line 224 through normally closed contacts K1-2, contacts K2-2 operated to the closed position and through the coil 134a of valve 134 to ground bus 123. The conveyor belts or chains are stopped whenever the push button of selector switch SS1 is released to thereby disconnect poles 2, 4, 8 and the circuits coupled thereto.

Means are provided for manually lowering the conveyor level to follow the shear blade. More particularly, when the operator operates switch SS3 to "continuous out", with switch SS2 in the "down" position, the conveyor down coils on valves 144 and 139 are energized over the circuit that extends from line 122 through poles 7 and 8 of switch SS3, lines 237, 238 and through the conveyor down coils 139b and 144b to ground bus 123. At the same time the conveyor out coil or conveyor forward coil 126a is operated when directional selector switch SS1 is operated to the out position with pols 5 and 6 joined together. So coil 126a is operated over the previously described circuit extending from line 122 through poles 3 and 4 of switch SS3, poles 5 and 6 of switch SS1, line 218 and through coil 126a.

It should be noted that the back gauge is forced into its down position by the return to normal of normally open contacts K3 whenever the conveyor is not in the upraised position. The open contacts K3-3 removes operating power from coil 183a. Thus, the back gauge cannot be raised while the conveyor is in anything but the table height position. Further, the back gauge cannot be raised if the conveyor is operating in the return position. This limitation is controlled by contacts K2-4 on the K2 relay. The K2 relay is energized whenever the conveyor is operating in the return mode over an obvious circuit.

For the automatic cycle the "Directionall" switch SS1 is turned to the "Out" position, the "Continuous Run and Raise" switch SS3 is turned to the "Raise" position and the "Automatic Control" switch SS2 is turned to "Automatic". This causes the conveyor to move to the topmost position over circuitry previously traced for energizing coils 139a and 144a. At this point the operator can job the conveyor forward by pushing in the directional control selector switch SS1. This jogs the conveyor forward by energizing coil 126 over the previously traced circuitry.

When the shear is operated in the automatic mode then the conveyor drops to its lowest position following the shear blade as previously described. This is accomplished through the energization of coils 139b and 144b over circuitry that extends from line 122 through shear contact CRB operated to lower the shear blade. When the blade and the conveyor is all the way down then contacts CRB and CRl of the shear open to return relay K4 to normal and deenergize coils 139b and 144b (K4-2 opens). The up coils 139a and 144a are energized over the circuit that extends from line 122, poles 1 and 2 of switch SS3, line 219, line 222, contacts CS1 on the shear line 223 contacts K4-4, K1-3, poles 1 and 3 of switch THLS, contacts TD2 on the timer and through coils 149a and 144a to ground line 122, contacts K4-1, poles 5 and 6 of switch SS1, line 218 and through the coil 126a to ground bus 123. Relay K4 is locked operated over circuitry that extends from line 219 through timing contact TD1 which are in the closed position at this point.

The timer is energized over the circuit that extends from line 122 through poles 1 and 2 of switch SS3, line 244, poles 3 and 4 of switch SS2, line 246, line 247 contacts K1-3, operated to the closed position, line 248, contacts K4-3 operated to the closed position and through the timer motor 251 to the ground bus 123. It should be noted that relay K1 is operated at this point, over the circuit that extends from 246 through normally closed contacts K2-3, and through the coil of the automatic relay K1 to the ground bus 123. When relay K4 is unenergized, the timer is operated through line 219, line 222, contact CS-1, line 223, contacts K1-2, K3-2 and TD4, and through the timer to ground bus 123.

The system can operate under the control of the timer so that repeated cuts are taken. Contacts T1-1 controls the back gauge up and down condition, while contacts T1-2 controls the conveyor down operation. Contacts TD1 and TD2 control the conveyor up and forward operation. Sufficient time is provided for the sheared piece to be removed from the conveyor, at which time the conveyor rises again.

The micro switches, such as switches SW11 and SW11' on the back gauge complete a circuit for pilot light PL2. When it is energized the operator knows that the plate to be sheared is properly positioned under the shear blade abutting the back gauge.

While the principles of the invention have been described above in connection with specific apparatus and applications, it is to be understood that this description is made only by way of example and not as a limitation on the scope of the invention.

I claim:

1. A material handling conveyor system for use in cooperation with shear equipment,
    said conveyor system including means for attaching said system to the rear of the shear equipment,
    said conveyor system comprising conveyor means having a top surface,
    said top surface having at least two vertical positions for receiving said material cut by said shear equipment and for returning said material to said shear equipment for further shearing operations, said conveyor means further having top surface means at the top surface thereof for conveying sheet material thereon, and means for controlling the direction of travel of said top surface means whereby the sheet material being conveyed is selectively directed away from said shear equipment or back to said shear equipment.

2. A material handling conveyor system for use in cooperation with conveyor equipment, said conveyor system comprising conveyor means having a raised position and a lowered position and having a top surface, said conveyor means further having top surface means at the top surface thereof for conveying sheet material thereon, means for moving the conveyor means between said raised position and said lowered position to support the sheet material while it is being sheared by the shear blade, whereby said top surface of the conveyor means follows the cut blade of the shear in the lowering process, and means for controlling the direction of travel of said top surface means whereby the sheet material being conveyed is selectively directed away from said shear equipment or back to said shear equipment.

3. The material handling conveyor system of claim 2 wherein the means of moving the conveyor means between the raised and the lowered positions are hydraulically operated.

4. The conveyor system of claim 3 wherein said conveyor means comprises frame means, a conveyor chain assembly mounted on said frame, said chain assembly comprising a plurality of endless chains, said chains being of varying width, drive sprocket wheels for driving said chain assembly, and hydraulic motor means for driving said sprocket wheels selectively toward or away from said shear equipment.

5. The conveyor system of claim 4 wherein said frame means comprises tubular means for minimizing the weight of said base assembly.

6. The conveyor system of claim 4 wherein said means for moving the conveyor means between said raised and lowered positions comprises hydraulic cylinder means pivotally mounted at one end to the frame means, said hydraulic cylinder means having movable pistons extending from the unmounted ends, said movable pistons being coupled to axle control members, said axle control members fixedly connected to axle means, said axle means being pivotally coupled to the frame and affixed to roller control members, roller means rotatably affixed to said roller control members, said roller means being juxtaposed to cross members extending below said conveyor chains, whereby the raising and lowering of the conveyor bed is accomplished responsive to the position of the pistons in the cylinders.

7. The conveyor system of claim 6 wherein the entire shear end of the conveyor is vertically movable and only one side of the other end of the conveyor is vertically movable.

8. The conveyor system of claim 7 wherein there are at least a first and a second cylinder at opposite sides of the shear end of the conveyor and one cylinder at the vertically movable side of the opposite end of the conveyor, and wherein control means are provided for adjusting the flow of hydraulic fluid to the pistons so that the conveyor lowers in a manner to follow the lowering of the shear blade and provide constant support for sheet material being sheared.

9. The conveyor system of claim 8 wherein electrically controlled hydraulic valves are used for controlling the operation of the hydraulic cylinder means.

10. The material handling conveyor system of claim 9 wherein means are provided for the raising and lowering of the conveyor independently of the operation of the shear blade.

11. The material handling system of claim 9 wherein contact means are provided for lowering the conveyor responsive to the lowering of the shear blade, said control means comprising:

first flow control means for operating the piston of the first cylinder on the shear end of the conveyor that is on the side of the conveyor adjacent to the lowest portion of the movable shear blade at a higher speed than the piston of the second cylinder, and second flow control means for operating the piston of the cylinder at the opposite end of the conveyor concomitantly with the operation of the piston of the first cylinder.

12. The material handling system of claim 11 wherein said flow control means comprise needle valve means adjusted so that the flow of hydraulic fluid to the cylinders provide for the lowering of the conveyor in the required order 13. A material handling conveyor means for use in cooperation with shear equipment, said conveyor system comprising a conveyor having a top surface, means for normally maintaining the top surface slightly above the top of the fixed blade of the shear equipment, said conveyor means including endless chain means for conveying sheet material thereon, and means for controlling the direction of the travel of said conveyor means for selectively transporting sheet material on the conveyor surface away from said shear equipment or back to said shear equipment.

14. The material handling conveyor system of claim 13 wherein means are provided for controlling the speed of movement of said endless chain means.

15. The material handling conveyor system of claim 13 wherein hydraulic motor means are provided for moving said endless chains, means for selectively operating said hydraulic motor clockwise or counterclockwise, sprocket wheel means coupled to said motor for operating said chains responsive to the operation of said motor, and means for selectively operating said motor at a high speed or at a low speed.

16. The conveyor system of claim 15 wherein said means for selectively operating said motor at a high speed or at a low speed comprises a first hydraulic path to said motor,
  a second hydraulic path for providing greater hydraulic flow to said motor,
  speed control valve means for normally closing off the second hydraulic path, and
  coil means in said speed control valve means energized for operating said speed control valve to enable the greater flow of hydraulic fluid through said motor to thereby provide a higher speed of said endless chain means.

17. The conveyor system of claim 13 wherein controls are provided to prevent the return operation of said endless chain means when the top surface of said conveyor is not at the normally upraised position.

18. The conveyor system of claim 13 wherein back gauge means are provided for use in measuring the length of the sheet material to be cut in the conveyor.

19. The material handling conveyor system of claim 18 wherein means are provided for automatically moving said back gauge from a position adjacent to the shear end of the conveyor system to a position a fixed distance away from the shear end of the conveyor, means for raising said back gauge to obstruct the sheet material on the conveyor, and
  means for returning said back gauge to its normally lowered position below the endless chains to enable the passage thereover of the sheet material.

20. The material handling system of claim 19 wherein the means provided for moving said back gauge comprises:
  back gauge hydraulic motor means,
  back gauge directional valve means for selectively operating said hydraulic motor in a clockwise or counterclockwise rotation,
  threaded rod means rotated by said back gauge hydraulic motor means,
  traveling nut means on said threaded rod means for traveling along said threaded rod means as said threaded rod rotates, and
  said back gauge being mounted on said traveling nut means whereby responsive to the rotation of said motor and said coupled threaded rod the traveling nut moves either toward or away from said shear equipment.

21. The conveyor system of claim 20 wherein means are provided for selectively running said back gauge hydraulic motor at a first or a second speed,
  said first speed being the normal speed and said second speed being the higher level speed, and
  said means for varying the speed comprising electrically controlled back gauge speed control hydraulic valve means,
  said back gauge speed control valve means in the unoperated position enabling a first amount of hydraulic fluid to flow through said hydraulic motor, and in the operated position enabling a greater amount of hydraulic fluid to flow to the hydraulic motor.

22. The conveyor system of claim 18 wherein means are provided for lowering said back gauge responsive to the lowering of said conveyor.

* * * * *

UNITED STATES PATENT OFFICE
CERTIFICATE OF CORRECTION

Patent No. 3,793,916   Dated February 26, 1974

Inventor(s) David J. Jarman

It is certified that error appears in the above-identified patent and that said Letters Patent are hereby corrected as shown below:

Col. 1, line 30          "thee" should be -- the --

Col. 10, line 34         "OUt" should be -- Out --
Col. 11, line 24         "celt" should be --belt --
Col. 11, line 43         "pols" should be -- poles --
Col. 11, line 66         "job" should be -- jog --
Col. 14, line 41 (Cl. 13)  "means" should be -- system --

Signed and sealed this 17th day of September 1974.

(SEAL)
Attest:

McCOY M. GIBSON JR.              C. MARSHALL DANN
Attesting Officer                Commissioner of Patents